United States Patent
Twitto et al.

(10) Patent No.: US 9,354,969 B2
(45) Date of Patent: May 31, 2016

(54) MEMORY CONTROLLER, METHOD OF OPERATING THE SAME, AND SYSTEM INCLUDING THE SAME

(71) Applicant: SAMSUNG ELECTRONICS CO., LTD., Suwon-si, Gyeonggi-do (KR)

(72) Inventors: Moshe Twitto, Givaat Shemuel (IL); Avner Dor, far Saba (IL); Jun Jin Kong, Yongin-si (KR); Chang Kyu Seol, Osan-si (KR); Hong Rak Son, Anyang-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 161 days.

(21) Appl. No.: 14/208,340

(22) Filed: Mar. 13, 2014

(65) Prior Publication Data

US 2014/0281827 A1    Sep. 18, 2014

(30) Foreign Application Priority Data

Mar. 15, 2013    (KR) .......................... 10-2013-0028187

(51) Int. Cl.
*G11C 29/00* (2006.01)
*G06F 11/10* (2006.01)

(52) U.S. Cl.
CPC .......... *G06F 11/1072* (2013.01); *G06F 11/108* (2013.01)

(58) Field of Classification Search
None
See application file for complete search history.

(56) References Cited

U.S. PATENT DOCUMENTS

| | | | |
|---|---|---|---|
| 6,802,039 B1 | 10/2004 | Quach et al. | |
| 7,120,836 B1 | 10/2006 | Englin et al. | |
| 7,411,829 B2 | 8/2008 | Diorio et al. | |
| 2005/0166121 A1 | 7/2005 | Kaewell, Jr. | |
| 2008/0301531 A1 | 12/2008 | Bell, Jr. et al. | |
| 2011/0246703 A1 | 10/2011 | Franceschini et al. | |
| 2012/0124442 A1* | 5/2012 | Strauss | G06F 11/0727 714/746 |
| 2012/0317460 A1* | 12/2012 | Chilappagari | G06F 11/1048 714/773 |
| 2013/0013977 A1* | 1/2013 | Rivers | G06F 11/1048 714/763 |
| 2013/0332799 A1* | 12/2013 | Cho | G06F 11/10 714/764 |
| 2014/0143637 A1* | 5/2014 | Cohen | H03M 13/1108 714/773 |
| 2014/0164873 A1* | 6/2014 | Guyot | G06F 11/08 714/764 |

* cited by examiner

*Primary Examiner* — Daniel McMahon
(74) *Attorney, Agent, or Firm* — F. Chau & Associates, LLC

(57) ABSTRACT

A method of processing data using a memory controller includes determining at least one cell state to which each of a plurality of multi-level cells can be changed to based on a current cell state of each multi-level cell, where each multi-level cell includes a plurality of data pages; determining one of the data pages as having a stuck bit when a value of the data page has a single mapping value based on mapping values mapped to the at least one cell state and generating stuck bit data regarding the stuck bit; and encoding write data to be stored in the multi-level cells based on the stuck bit data.

19 Claims, 19 Drawing Sheets

FIG. 7

<BIT-LABELING MAP>

| STATES | E | P1 | P2 | P3 |
|---|---|---|---|---|
| PAGE1 | 1 | 1 | 0 | 0 |
| PAGE2 | 1 | 0 | 0 | 1 |

FIG. 8

<PRE-PROGRAMMED STATE>

| STATES | P1 |
|--------|----|
| PAGE1  | 1  |
| PAGE2  | 0  |

FIG. 9

<POSSIBLE PROGRAMMING STATE>

| STATES | P2 | P3 |
|---|---|---|
| PAGE1 | 0 | 0 | ← STUCK BIT
| PAGE2 | 0 | 1 |

# MEMORY CONTROLLER, METHOD OF OPERATING THE SAME, AND SYSTEM INCLUDING THE SAME

CROSS-REFERENCE TO RELATED APPLICATIONS

This application claims priority under 35 U.S.C. §119(a) to Korean Patent Application No. 10-2013-0028187 filed on Mar. 15, 2013, the disclosure of which is hereby incorporated by reference in its entirety herein.

BACKGROUND

1. Technical Field

Exemplary embodiments of the inventive concept relate to a memory controller, and more particularly, to a method of encoding write data according to stuck bit data generated based on a cell state of multi-level cells and devices using the same.

2. Discussion of Related Art

Non-volatile memory devices are widely used in a variety of products such as laptop computers, tablet computers, smart phones, digital cameras, and personal digital assistants (PDAs). A flash memory device is a representative example of a non-volatile memory device.

Memory cells in the flash memory device may be divided into a single level cell (SLC) and a multi-level cell (MLC) according to the number of bits of data that can be stored in each memory cell. The SLC is a memory cell that can store information of one bit and the MLC is a memory cell that can store information of two bits or more.

Data previously stored within the flash memory device can be erased by performing an erase and operation and new data can be stored within the flash memory by performing a program operation. However, as the program and erase operations are repeated, the lifespan of flash memory cells decrease and there may be flash memory cells from which data is not completely erased even after the erase operation is performed on the flash memory cells.

SUMMARY

According to an exemplary embodiment of the inventive concept, there is provided a method of processing data using a memory controller. The method includes determining at least one cell state to which each of a plurality of multi-level cells can be changed to based on a current cell state of each of the multi-level cells, where each multi-level cell includes a plurality of data pages; determining one of the data pages as having a stuck bit when a value of the data page has a single mapping value based on mapping values mapped to the at least one cell state and generating stuck bit data regarding the stuck bit; and encoding write data to be stored in the multi-level cells based on the stuck bit data.

The stuck bit data may include information about a position of the stuck bit and information about a stuck value of the stuck bit. The mapping values may be mapped to the at least one cell state using a gray code. The encoding the write data may be performed page by page.

The encoding may be performed using a binary code. The encoding may be performed on each page using a code having a different number of bits. The encoding may include rearranging the write data based on the stuck bit data.

According to an exemplary embodiment of the inventive concept, there is provided a memory controller including a possible state determination module configured to determine at least one cell state to which each of a plurality of multi-level cells can be changed to based on a current cell state of each of the multi-level cells, where each multi-level cell includes a plurality of data pages; a stuck bit data generation module configured to determine one of the data pages as having a stuck bit when a value of the data page has a single mapping value and to generate stuck bit data regarding the stuck bit; and an encoder configured to encode write data to be stored in the multi-level cells based on the stuck bit data.

The stuck bit data generation module may include a possible bit value determination module configured to determine a mapping value corresponding to each of the data pages based on the mapping values mapped to the at least one cell state in a bit-labeling map and a stuck bit determination module configured to determine the data page having a single mapping value as the stuck bit according to a determination result (e.g., an output) of the possible bit value determination module and to generate the stuck bit data regarding the stuck bit.

The stuck bit data may include information about a position of the stuck bit and information about a stuck value of the stuck bit. The encoder may perform encoding page by page. The encoder may encode each page using a code having a different number of bits.

According to an exemplary embodiment of the inventive concept, a memory controller is configured to interface with a memory device. The memory controller includes a determination module. The determination module includes an entry for each data page of a multi-bit cell and each entry indicates a plurality of programming states. The determination module determines a given page of a multi-bit cell within the memory device has a fault when a threshold voltage associated with the multi-bit data cell is representative of one of the programming states, and all bits among the programming states associated with a higher threshold voltage within the entry associated with the given page are the same.

In an exemplary embodiment, the determination module generates error information that indicates the data page is fixed (e.g., stuck) to a first bit value. In an exemplary embodiment, the determination module includes an encoder that is configured to encoded data for storage in a part of the memory device including the data page by rearranging the encoded data to ensure that a data bit of the encoded data set to a second other bit value is not stored in the data page.

According to an exemplary embodiment of the inventive concept, there is provided a memory system including one of the above-described memory controllers and a memory device including the plurality of multi-level (e.g., multi-bit) cells. The memory device may be a NAND flash memory device.

According to an exemplary embodiment of the inventive concept, there is provided an electronic device including the above-described memory system and a buffer manager configured to control a data buffering operation of the memory controller. The memory device may be a NAND flash memory device.

BRIEF DESCRIPTION OF THE DRAWINGS

The inventive concept will become more apparent by describing in detail exemplary embodiments thereof with reference to the attached drawings in which:

FIG. 7 is a diagram of an exemplary bit-labeling map in the memory system illustrated in FIG. 1;

FIGS. 8 and 9 are diagrams for explaining a procedure for determining a stuck bit included in the stuck cells illustrated in FIG. 6;

DETAILED DESCRIPTION

Figure 1:
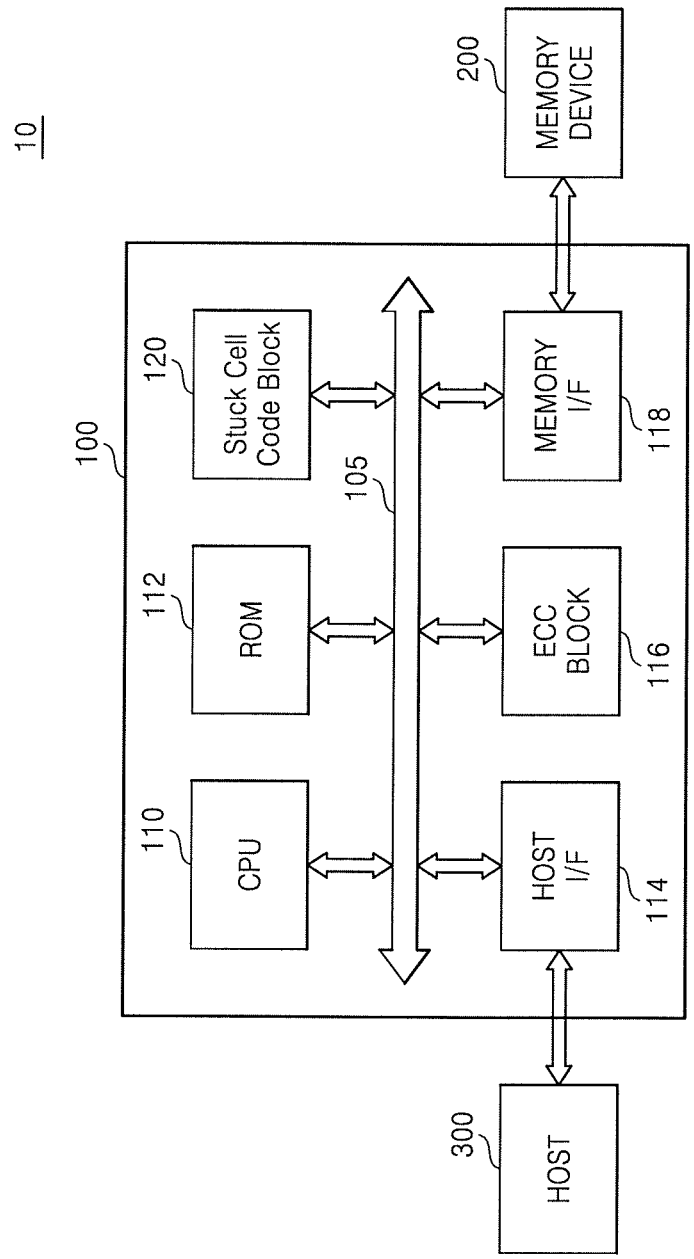
FIG. 1 is a block diagram of a memory system according to an exemplary embodiment of the inventive concept.

The inventive concept now will be described more fully hereinafter with reference to the accompanying drawings, in which exemplary embodiments of the invention are shown. This invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Hereinafter, the term "module" may indicate the functional or structural combination between hardware for performing a method according to at least one embodiment of the inventive concept and software for driving the hardware. Accordingly, the module may indicate a logical unit or group of a program code and a hardware resource for performing the program code and does not necessarily indicate physically connected codes or a certain type of hardware.

FIG. 1 is a block diagram of a memory system 10 according to an exemplary embodiment of the inventive concept.

The memory system 10 may be implemented as a personal computer (PC), a data server, or a portable device. The portable device may be a laptop computer, a mobile telephone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device, or an e-book.

The memory system 10 includes a memory controller 100 and a memory device 200. For clarity of the description, a host 300 is also illustrated in FIG. 1.

The memory controller 100 includes a central processing unit (CPU) 110, a read-only memory (ROM) 112, a host interface 114, an error correction code (ECC) block 116, a memory interface 118, and a stuck cell code block 120. The elements 110, 112, 114, 116, 118, and 120 may communicate with one another through a bus 105.

The CPU 110 may be implemented as a circuit, a logic, a code, or a combination thereof. The CPU 110 may control the overall operation of the elements 112, 114, 116, 118, and 120 included in the memory controller 100. The ROM 112 may store a program code necessary for the operation of the CPU 110. Despite its name, the ROM 112 may be implemented by a non-volatile memory.

The host interface 114 may interface data signals between the host 300 and the memory controller 100. For example, the host interface 114 enables the host 300 to communication with the memory controller 100. The ECC block 116 may encode data to be stored in the memory device 200 or decode data output from the memory device 200 using a parity bit, e.g., an ECC to detect error bits and correct the error bits.

In an exemplary embodiment, the ECC block 116 is not present within the memory controller 100. The memory interface 118 may interface data signals between the memory controller 100 and the memory device 200. For example, the memory interface 118 enables the memory controller to read data from the memory device 200 and write data to the memory device 200.

When stuck cells or stuck bits are present in the memory device 200, the stuck cell code block 120 may process (e.g., encode or decode) data so that the data can be stored even in the stuck cells or bits. Here, a stuck cell or a stuck bit may indicate a cell or bit that is not completely erased even after an erase operation and thus has a constraint on a program operation thereafter. For example, if a bit in the programmed state is 0, the bit would be considered stuck if upon an erase operation being performed on the bit, which should set the bit to 1, the bit remains set to 0 (e.g., stuck at 0). The structure and operation of the stuck cell code block 120 will be described in detail with reference to FIGS. 2 through 12.

The memory device 200 is a medium for storing data and may be implemented as a hard disk, a volatile memory device, or a non-volatile memory device.

The non-volatile memory device may be implemented as electrically erasable programmable read-only memory (EEPROM), flash memory, magnetic random access memory (MRAM), spin-transfer torque MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory.

The memory device 200 may include a plurality of multi-level cells (MLCs) (not shown). An MLC can store information of two bits or more and may conceptually include a triple level cell (TLC).

The host 300 may transmit a request for a program operation of the memory device 200, e.g., a flash memory device, and data to be programmed to the memory device 200 to the memory controller 100 through the host interface 114. In response to the request, the memory controller 100 may generate a page address of a page, in which the data will be stored in the memory device 200, and/or a word line address corresponding to the page. Before the memory device 200 performs the program operation, the memory controller 100 may control the memory device 200 to read a cell state of each of the MLCs at the request of the host 300.

Figure 2:
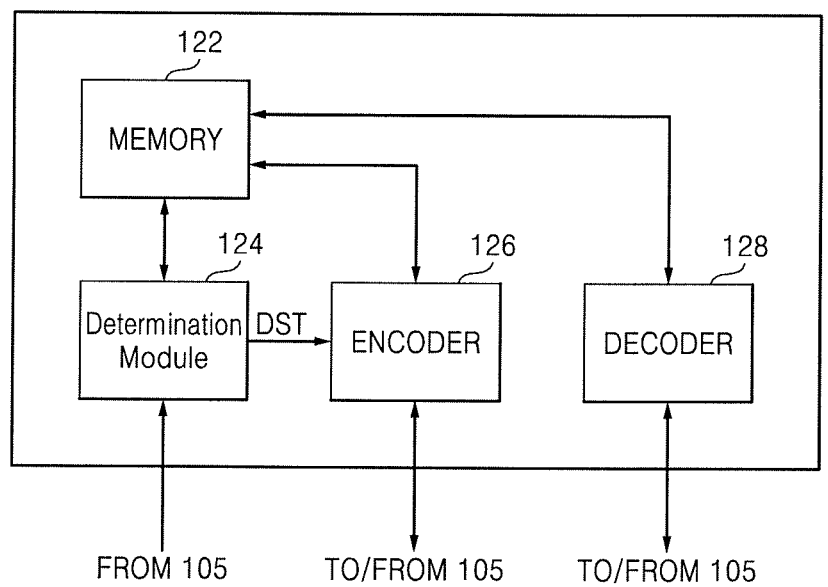
FIG. 2 is a block diagram of an example of a stuck cell code block illustrated in FIG. 1 according to an exemplary embodiment of the inventive concept.

FIG. 2 is a block diagram of an example 120A of the stuck cell code block 120 illustrated in FIG. 1 according to an exemplary embodiment of the inventive concept. Referring to FIGS. 1 and 2, the stuck cell code block 120A includes a memory 122, a determination module 124, an encoder 126, and a decoder 128.

The memory 122 may store data necessary for the operation of each of the elements 124, 126, and 128 included in the stuck cell code block 120A. The determination module 124 receives a cell state of each of the MLCs included in the memory device 200 from the memory device 200 through the bus 105 and outputs stuck bit data DST about a stuck bit included in each MLC based on the cell state. In an exemplary embodiment, the memory 122 stores a bit-labeling map necessary for the operation of the determination module 124. The bit-labeling map will be described with reference to FIG. 7 below.

The stuck bit data DST includes information about the position of a stuck bit and/or information about a stuck value of the stuck bit. The information about the position of the stuck bit may be address data of the stuck bit. The stuck value may be a value that can be programmed to the stuck bit. For example, the stuck bit data DST may indicate the location of a stuck bit in memory device 200 and the value the bit is stuck to (e.g., 0/1). For example, if a bit is 0 in the programmed state and 1 in the erased state, it could be stuck in the programmed state or stuck in the erased state. If a bit is stuck in the programmed state, it can never be erased or can cannot always be erased, and if a bit is stuck in the erased state, it can never be programmed or cannot always be programmed.

The encoder 126 may encode write data to be stored in (e.g., programmed to) MLCs in the memory device 200 based on the stuck bit data DST. The encoder 126 may perform encoding using a systematic coding scheme or a non-systematic coding scheme. The encoder 126 may perform encoding in units of pages. Alternatively, the encoder 126 may encode using a binary code. As another alternative, the encoder 126 may encode each page using a different code or algorithm. The operation of the encoder 126 will be described in detail with reference to FIGS. 10 through 12 below.

The write data encoded by the encoder 126 may be transmitted to the memory device 200 through the bus 105 and the memory interface 118. The decoder 128 may receive read data from the memory device 200 through the memory interface 118 and the bus 105 and decode the read data.

Figure 3:
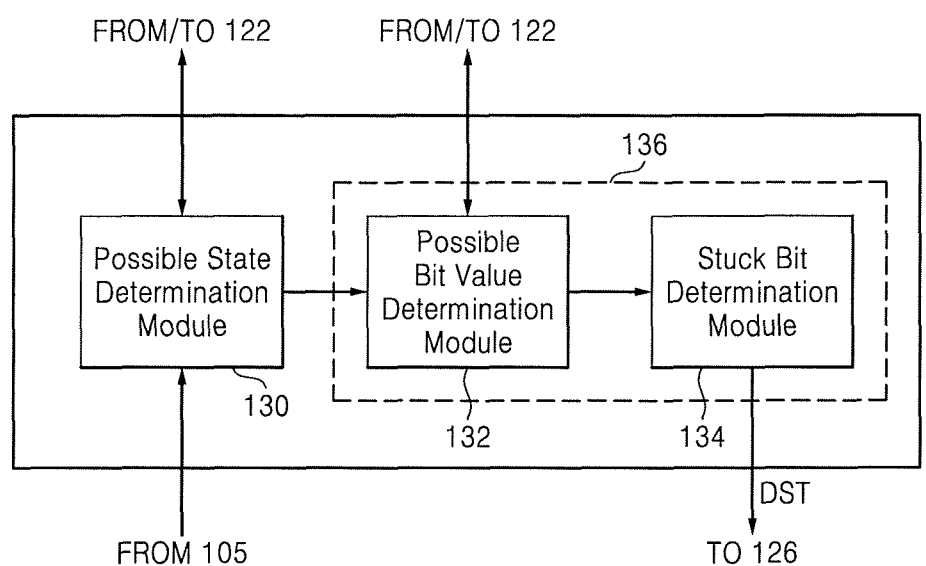
FIG. 3 is a block diagram of a determination module illustrated in FIG. 2 according to an exemplary embodiment of the inventive concept.

FIG. 3 is a block diagram of the determination module 124 illustrated in FIG. 2 according to an exemplary embodiment of the inventive concept. Referring to FIGS. 1 through 3, the determination module 124 includes a possible state determination module 130 and a stuck bit data generation module 136.

Before the memory device 200 performs a program operation, the memory controller 100 controls the memory device 200 to read the cell state of each of the MLCs included in the memory device 200 at the request of the host 300. The read operation may be performed after an erase operation.

The possible state determination module 130 receives the cell state of each MLC through the bus 105. The possible state determination module 130 determines at least one cell state to which the MLC is changed based on the received cell state. The at least one cell state to which the MLC is changed may result from a program operation. In this case, the at least one cell state to which the MLC is changed may have a higher threshold voltage distribution than the received cell state of the MLC.

The stuck bit data generation module 136 generates the stuck bit data DST according to the determination result of the possible state determination module 130. The stuck bit data generation module 136 includes a possible bit value determination module 132 and a stuck bit determination module 134.

The possible bit value determination module 132 determines a mapping value corresponding to each of data pages included in each of the MLCs based on mapping values mapped to the at least one cell state determined by the possible state determination module 130. Here, a data page may be each bit of MLC corresponding to each page.

The stuck bit determination module 134 determines a data page having a single mapping value as a stuck bit according to the determination result of the possible bit value determination module 132 and generates the stuck bit data DST regarding the stuck bit.

The operations of the possible state determination module 130, the possible bit value determination module 132, and the stuck bit determination module 134 will be described in detail with reference to FIGS. 5 through 9 below. FIG. 3 shows that the possible state determination module 130, the possible bit value determination module 132, and the stuck bit determination module 134 are functionally and logically separated from one another, but the inventive concept is not limited thereto. For example, each element need not be implemented as a separate physical device or code.

Figure 4:
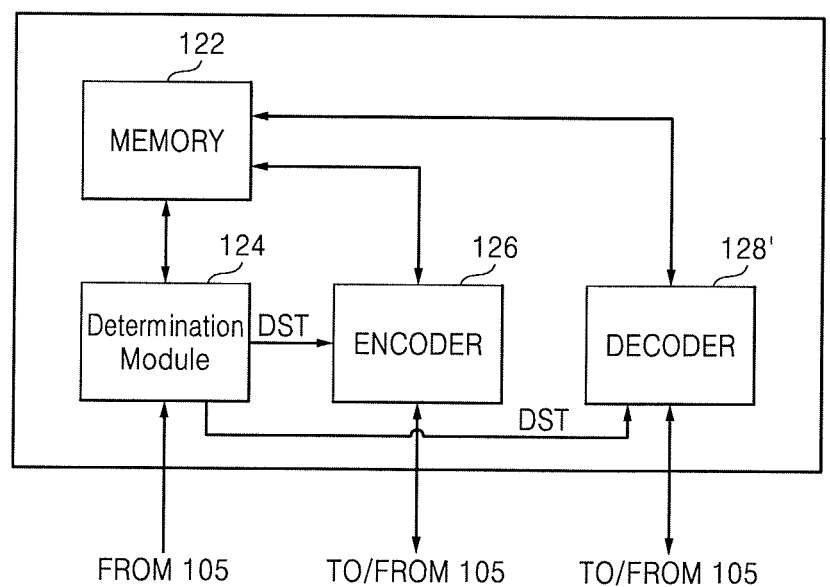
FIG. 4 is a block diagram of another example of a stuck cell code block illustrated in FIG. 1 according to an exemplary embodiment of the inventive concept.

FIG. 4 is a block diagram of another example 120B of the stuck cell code block 120 illustrated in FIG. 1. Referring to FIGS. 1 through 4, the structure and operation of the stuck cell code block 120B is substantially the same as the stuck cell code block 120A illustrated in FIG. 2, with the exception that a decoder 128' receives the stuck bit data DST from the determination module 124.

The decoder 128' included in the stuck cell code block 120B may receive data read from the memory device 200 through the memory interface 118 and the bus 105 and may decode the data using the stuck bit data DST.

Figure 5:
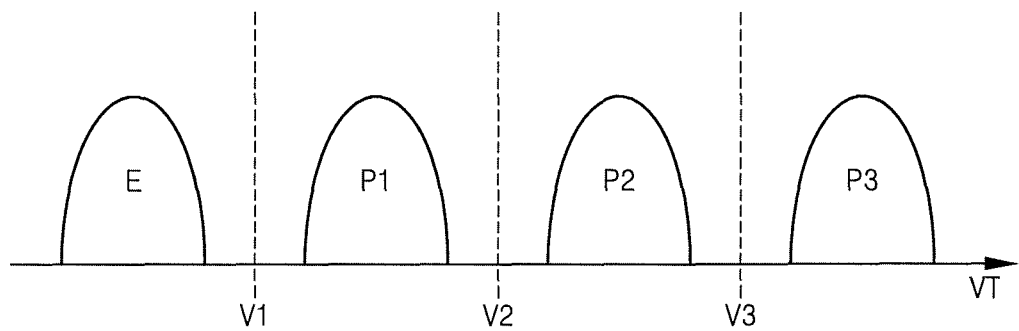
FIG. 5 is a diagram of exemplary threshold voltage distributions of a memory device illustrated in FIG. 1.

FIG. 5 is a diagram of exemplary threshold voltage distributions of the memory device 200 illustrated in FIG. 1. FIG. 5 shows the threshold voltage distributions of MLCs, where each MLC stores two bits.

A cell state E corresponding to an erase state has the lowest threshold voltage distribution. Cell states P1, P2, and P3 corresponding to a program state respectively have sequentially arranged threshold voltage distributions. Each of the cell states E, P1, P2, and P3 is mapped to a data bit using various types of code, e.g., a gray code. The cell states E, P1, P2, and P3 may be read using a read voltage V1, V2, and/or V3.

Figure 6:
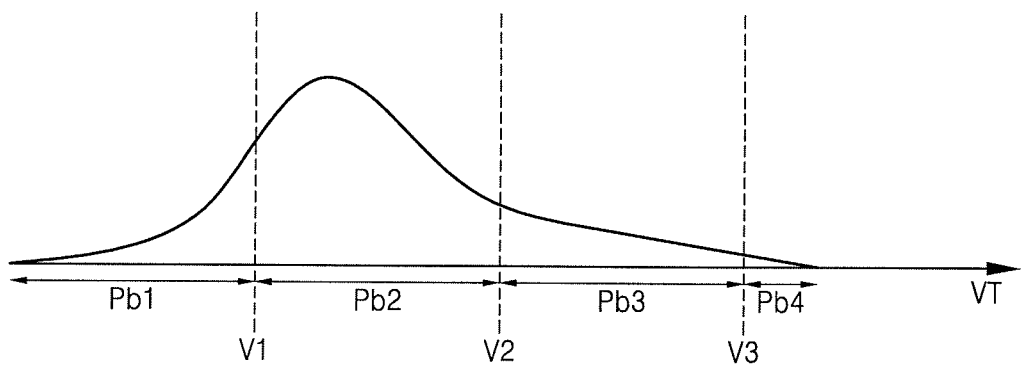
FIG. 6 is a diagram of exemplary threshold voltage distribution of stuck cells included in the memory device illustrated in FIG. 1.

FIG. 6 is a diagram of the threshold voltage distribution of stuck cells included in the memory device 200 illustrated in FIG. 1. Referring to FIGS. 1, 5, and 6, an MLC that has been erased in ideal conditions is supposed to have the threshold voltage distribution of the cell state E illustrated in FIG. 5, but the MLC may have an asymmetric threshold voltage distribution as shown in FIG. 6 according to the characteristic of the MLC. For example, an MLC that has been erased ideally has a threshold voltage that is less than voltage V1.

Referring to FIG. 6, a probability value Pb1, Pb2, Pb3, or Pb4 indicates a probability that MLCs having the threshold voltage distribution as shown in FIG. 6 have the cell state E, P1, P2, or P3 after an erase operation. FIG. 6 illustrates the threshold voltage distribution of stuck cells having the cell state P1 even after the erase operation.

FIG. 7 is a diagram of an exemplary bit-labeling map in the memory system 10 illustrated in FIG. 1. Referring to FIGS. 1, 3, 5, and 7, the bit-labeling map shows the mapping relationship between the cell states E, P1, P2, and P3 and data bits using the gray code. The bit-labeling map shown in FIG. 7 is just an example. The inventive concept may also be applied to at least three-bit MLC and a code used for mapping is not restricted to the gray code.

A 2-bit MLC stores 2-bit data corresponding to two pages PAGE1 and PAGE2. For instance, the cell state E may be mapped to data of "11", the cell state P1 may be mapped to data of "10", the cell state P2 may be mapped to data of "00", and the cell state P3 may be mapped to data of "01".

FIGS. 8 and 9 are diagrams for explaining a procedure for determining a stuck bit included in the stuck cells illustrated in FIG. 6. Referring to FIG. 3 and FIGS. 6 through 9, the cell state of a stuck cell having the cell state P1 even after the erase operation, as shown in FIG. 6, may be read as pre-programmed in the cell state P1, as shown in FIG. 8.

The possible state determination module 130 determines at least one possible cell state (e.g., P2 and P3) to which the MLC may be changed based on the read cell state P1. The at least one possible cell state (e.g., P2 and P3) to which the MLC may be changed is a cell state to which the MLC may be changed from the read cell state P1 by a program operation, that is, a cell state that has a higher threshold voltage distribution.

The possible bit value determination module 132 determines a mapping value corresponding to each of the data pages PAGE1 and PAGE2 included in the MLC based on mapping values mapped to the at least one possible cell state (e.g., P2 and P3) determined by the possible state determination module 130. In this case, a mapping value corresponding to the data page PAGE1 is "0" and a mapping value corresponding to the data page PAGE2 is "0" or "1".

The stuck bit determination module 134 determines the data page having a single mapping value as a stuck bit according to the determination result of the possible bit value determination module 132. Referring to FIG. 9, since the data page PAGE1 has a single mapping value of "0", the stuck bit determination module 134 determines the data page PAGE1 as a stuck bit. At this time, the stuck value of the stuck bit is "0". The stuck bit determination module 134 generates the stuck bit data DST regarding the stuck bit.

For example, assume that a 2-bit MLC was initially erased (e.g., PAGE1=1 and PAGE2=1), and then a program operation is performed on the 2-bit MLC. It is expected that the program operation would set PAGE1=0 and PAGE2=0. However, if the MLC instead has a PAGE1=1 and PAGE2=0 (e.g., state P1), the states with the next higher threshold voltages are P2 (e.g., PAGE1=0, PAGE2=0) and P3 (PAGE1=0, PAGE2=1). Thus, since PAGE1 is the same value in both states P2 and P3 (i.e., 0), PAGE1 is the stuck bit, and since PAGE2 is a different value in both states P2 and P3 (i.e., 0/1), PAGE2 is not the stuck bit.

In an exemplary embodiment, a determination module (e.g., 120A) determines a given page (e.g., PAGE1) of a multi-bit cell (e.g., having pages PAGE1 and PAGE2) within the memory device 200 has a fault (e.g., is stuck) when a threshold voltage associated with the multi-bit data cell is representative of one of the programming states (e.g., when PAGE1=1 and PAGE2=0 the multi-bit cell has a voltage between V1 and V2 representative of state P1), and all bit values among the programming states associated with a higher threshold voltage (e.g., P2 associated with a voltage between V2 and V3, and P3 associated with a voltage between V3 and VT) within the entry associated with the given page are the same (e.g., PAGE1 in FIG. 7 during states P2 and P3 can only be a same bit value 0).

Figure 10:
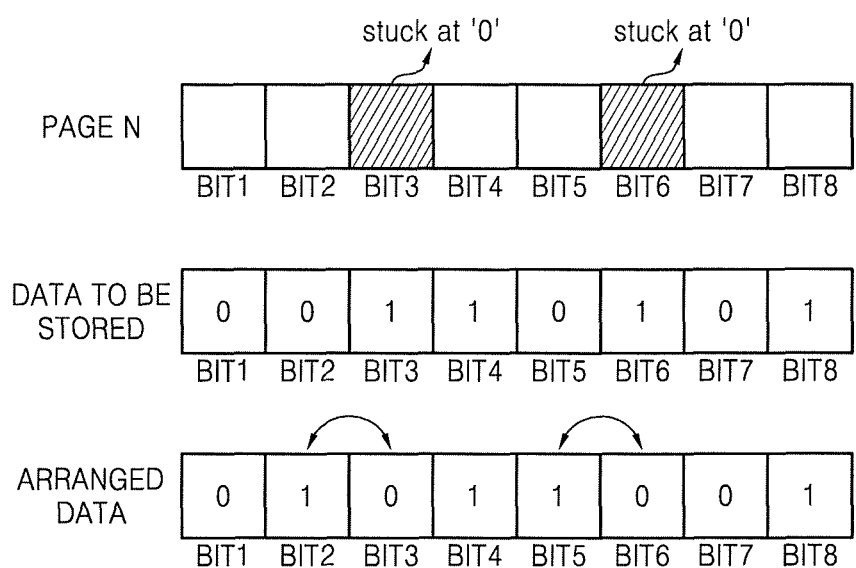
FIG. 10 is a diagram for explaining an embodiment in which the stuck cell code block illustrated in FIG. 1 encodes a data array using a non-systematic coding scheme.

FIG. 10 is a diagram for explaining an embodiment in which the stuck cell code block 120 illustrated in FIG. 1 encodes a data array using a non-systematic coding scheme. According to the non-systematic coding scheme, an original data array does not remain after encoding. In other words, the original data array is rearranged during encoding.

Referring to FIGS. 1 through 4 and FIG. 10, when a third bit BIT3 and a sixth bit BIT6 in an N-th page PAGEN are determined as stuck bits having a stuck value of "0", a data array "00110101" to be stored in the N-th page PAGEN may be rearranged into "01011001". In other words, the data array is rearranged so that "0" is stored in the stuck bits, i.e., the third and sixth bits BIT3 and BIT6 having the stuck value of "0". For convenience' sake in the description, data rearrangement occurs between adjacent bits BIT2 and BIT3 and BIT5 and BIT6 in the embodiments illustrated in FIG. 10, but the inventive concept is not limited thereto. The data array may be rearranged using various types of algorithm.

Figure 11:
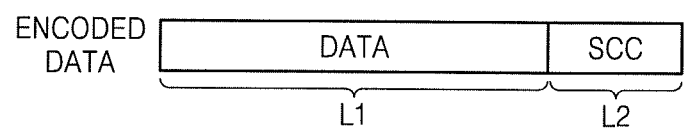
FIG. 11 is a diagram for explaining an exemplary embodiment in which the stuck cell code block illustrated in FIG. 1 encodes a data array using a systematic coding scheme.

FIG. 11 is a diagram for explaining an embodiment in which the stuck cell code block 120 illustrated in FIG. 1 encodes a data array using a systematic coding scheme. According to the systematic coding scheme, an original data array remains even after encoding. An additional bit may be added to the original data array during encoding.

Referring to FIGS. 1 through 4 and FIGS. 10 and 11, the encoder 126 adds a stuck cell code SCC including information about a stuck cell (or a stuck bit) to the original data array DATA during encoding. A data length L1 of the data array DATA corresponds to the number of MLCs included in a single word line. For example, if there are 1000 2-bit MLCs in a single word line, the data length L1 would be 1000. A code length L2 of the stuck cell code SCC may be the same or different page to page. When the code length L2 is different page to page, the code length L2 of the stuck cell code SCC regarding a data array to be stored in a particular page may be 100 bits while the code length L2 of the stuck cell code SCC regarding a data array to be stored in a page other than the particular page is 150 bits, as an example.

Figure 12:
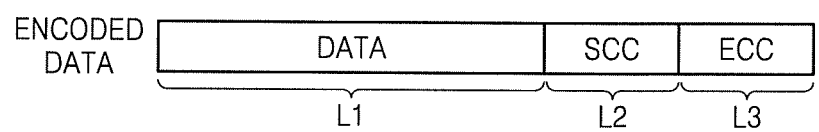
FIG. 12 is a diagram for explaining an exemplary embodiment in which the stuck cell code block illustrated in FIG. 1 encodes a data array using the systematic coding scheme.

FIG. 12 is a diagram for explaining another embodiment in which the stuck cell code block 120 illustrated in FIG. 1 encodes a data array using the systematic coding scheme. Referring to FIGS. 1 through 4 and FIGS. 11 and 12, as well as the stuck cell code SCC, a parity bit, e.g., an ECC may be added to the data array DATA during encoding. The ECC may be added by the ECC block 116.

The code length L2 of the stuck cell code SCC may be the same page to page and a code length L3 of the ECC may also be the same page to page. Alternatively, the code length L2 of the stuck cell code SCC and the code length L3 of the ECC may be different page to page. For instance, the code length L2 of the stuck cell code SCC regarding a data array to be stored in a particular page may be 100 bits and the code length L3 of the ECC may be 50 bits while the code length L2 of the stuck cell code SCC regarding a data array to be stored in a page other than the particular page is 50 bits and the code length L3 of the ECC is 100 bits, as an example.

When the code length L2 of the stuck cell code SCC and the code length L3 of the ECC are different page to page, the ECC block 116 and the stuck cell code block 120 may perform encoding page by page. In addition, the ECC block 116 and the stuck cell code block 120 may encode each page using a different code or algorithm.

Figure 13:
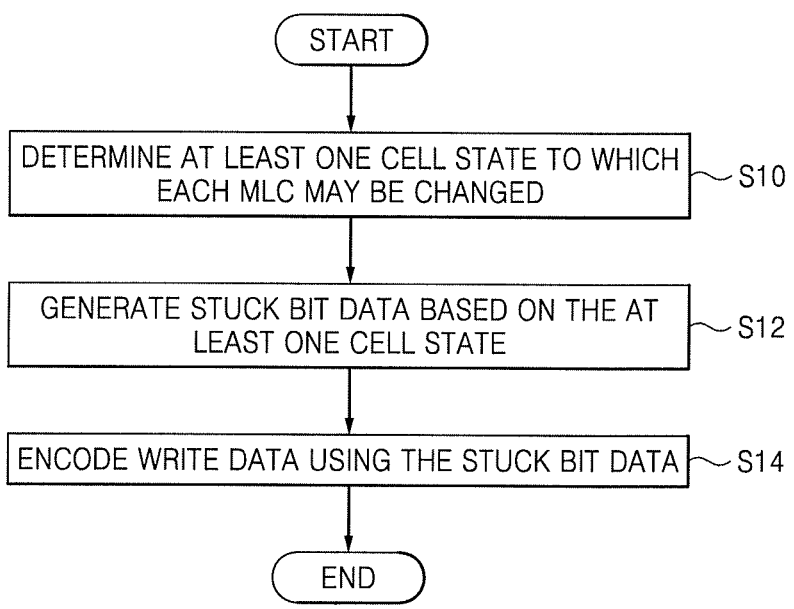
FIG. 13 is a flowchart of a method of processing data using a memory controller according to an exemplary embodiment of the inventive concept.

FIG. 13 is a flowchart of a method of processing data using the memory controller 100 according to an exemplary embodiment of the inventive concept. Referring to FIGS. 1 through 4 and FIG. 13, the determination module 124 determines at least one cell state to which each of MLCs included in the memory device 200 may be changed (S10). For example, as discussed above, if a 2-bit MLC is currently in state P1, it can be changed to P2 and P3.

Prior to operation S10, the memory controller 100 may control the memory device 200 to read a cell state of each MLC at the request of the host 300. At this time, the determination module 124 may determine the at least one cell state to which each MLC may be changed based on the read cell state of each MLC.

The determination module 124 generates the stuck bit data DST based on the at least one cell state that has been determined (S12). The determination module 124 may determine a mapping value corresponding to each of data pages included in each MLC based on mapping values mapped to the at least one cell state. At this time, the determination module 124 may determine a data page having a single mapping value as a stuck bit and generate the stuck bit data DST regarding the stuck bit. For example, as discussed above, since PAGE1=0 and is 0 in both states P2 and P3, PAGE1 would be determined as the stuck bit. The encoder 126 may encode write data to be stored in (e.g., programmed to) the MLCs included in the memory device 200 based on the stuck bit data DST (S14). For example, if it is determined that some bits of a word line are stuck to 0, and 1s are desired to be stored in the stuck bits, the encoder 126 can re-arrange the data that is to be stored in the word line so that other bits (i.e., bits that are not stuck) are used to store those 1 s.

Figure 14:
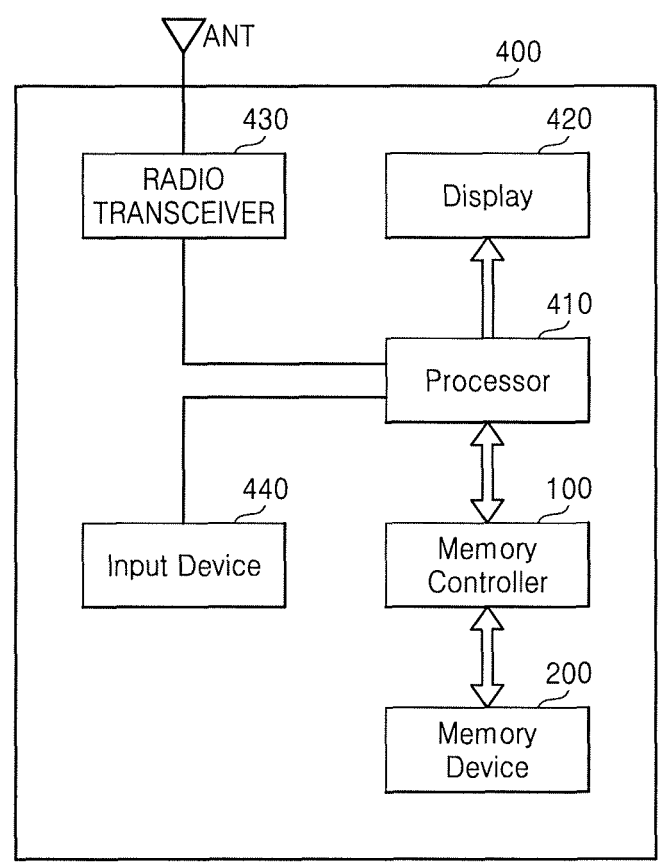
FIG. 14 is a diagram of an electronic device including the memory system illustrated in FIG. 1 according to an exemplary embodiment of the inventive concept.

FIG. 14 is a diagram of an electronic device 400 including the memory system 10 illustrated in FIG. 1 according to an exemplary embodiment of the inventive concept. Referring to FIGS. 1 and 14, the electronic device 400 may be implemented as a cellular/mobile phone, a smart phone, a tablet PC, a PDA, a video game console, or a handheld communication device.

The electronic device 400 includes the memory controller 100 and the non-volatile memory device 200. The memory controller 100 may control the data processing operations, such as a program operation, an erase operation, and a read operation, of the non-volatile memory device 200 according to the control of a processor 410.

Data programmed in the non-volatile memory device 200 may be displayed through a display 420 according to the control of the processor 410 and/or the memory controller 100. The display 420 may be implemented as a flat panel display such as a thin film transistor liquid crystal display (TFT-LCD), a light emitting diode (LED) display, an organic LED (OLED) display, or an active matrix OLED (AMOLED) display.

A radio transceiver 430 transmits or receives radio signals through an antenna ANT. The radio transceiver 430 may convert radio signals received through the antenna ANT into signals that can be processed by the processor 410. The processor 410 may process the signals output from the radio transceiver 430 and transmit the processed signals to the memory controller 100 or the display 420. The memory controller 100 may program the signals processed by the processor 410 to the non-volatile memory device 200. The radio transceiver 430 may also convert signals output from the processor 410 into radio signals and output the radio signals to an external device through the antenna ANT.

An input device 440 enables control signals for controlling the operation of the processor 410 or data to be processed by the processor 410 to be input to the electronic device 400. The input device 440 may be implemented by a pointing device such as a touch pad or a computer mouse, a keypad, or a keyboard.

The processor 410 may control the operation of the display 420 to display data output from the memory controller 100, data output from the radio transceiver 430, or data output from the input device 440. The memory controller 100, which controls the operations of the non-volatile memory device 200, may be implemented as a part of the processor 410 or as a separate chip.

Figure 15:
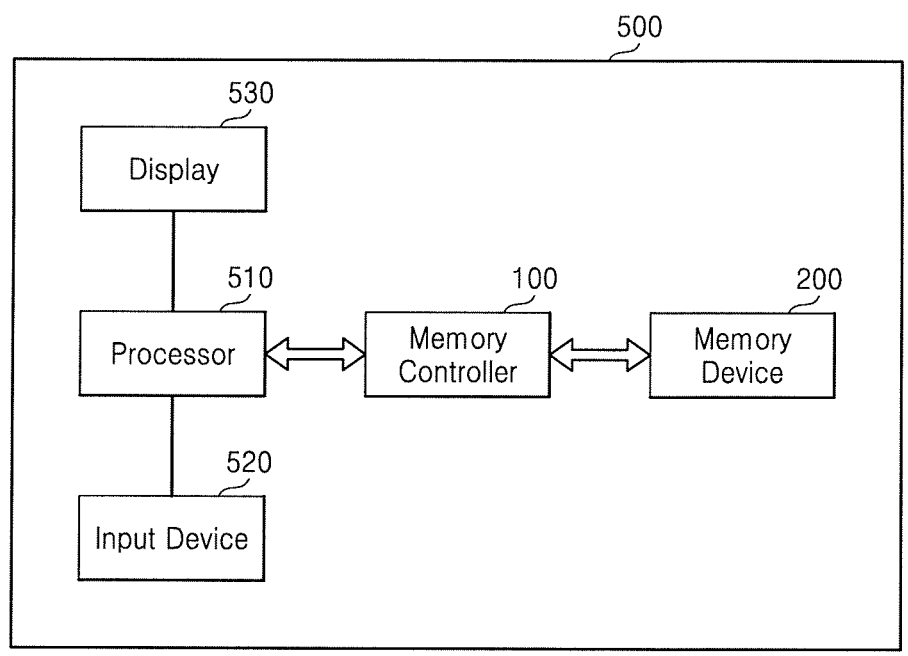
FIG. 15 is a diagram of an electronic device including the memory system illustrated in FIG. 1 according to an exemplary embodiment of the inventive concept.

FIG. 15 is a diagram of an electronic device 500 including the memory system 10 illustrated in FIG. 1 according to an exemplary embodiment of the inventive concept. Referring to FIGS. 1 and 15, the electronic device 500 may be implemented as a PC, a laptop computer, a net-book, an e-reader, a PMP, an MP3 player, or an MP4 player.

The electronic device 500 includes the non-volatile memory device 200 and the memory controller 100 controlling the data processing operations of the non-volatile memory device 200. A processor 510 may display data stored in the non-volatile memory device 200 on a display 530 according to data input through an input device 520. The input device 520 may be implemented by a pointing device such as a touch pad or a computer mouse, a keypad, or a keyboard. The input device 520 may also interface data with other devices.

The processor 510 may control the overall operation of the electronic device 500 and the operations of the memory controller 100. The memory controller 100, which may control the operations of the non-volatile memory device 200, may be implemented as a part of the processor 510 or as a separate chip.

Figure 16:
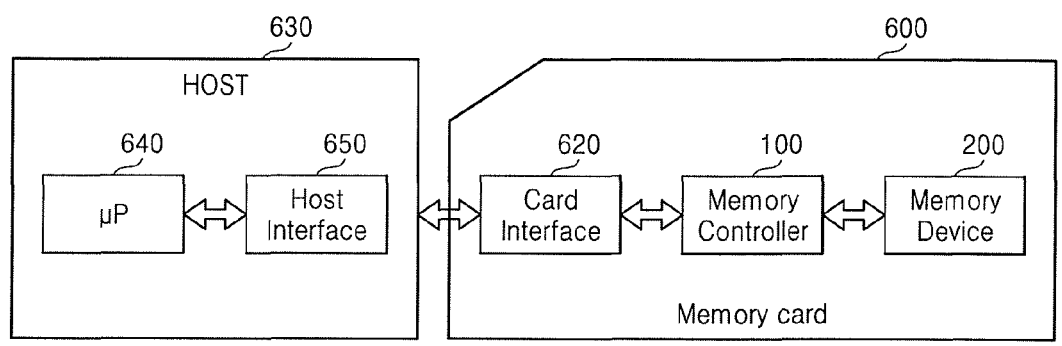
FIG. 16 is a diagram of an electronic device including the memory system illustrated in FIG. 1 according to an exemplary embodiment of the inventive concept.

FIG. 16 is a diagram of an electronic device 600 including the memory system 100 illustrated in FIG. 1 according to an exemplary embodiment of the inventive concept. For clarity of the description, a host 630 is also illustrated in FIG. 16. The electronic device 600 may be implemented as a memory card or a smart card. The memory card may be an electronic flash memory data storage device used to store digital information.

The memory card may be implemented as a PC card, a multimedia card (MMC), an embedded MMC (e-MMC), a secure digital (SD) card, or a universal serial bus (USB) flash drive.

The electronic device 600 such as a memory card includes the memory controller 100, the non-volatile memory device 200, and a card interface 620. The memory controller 100 may control data exchange between the non-volatile memory device 200 and the card interface 620. The card interface 620 may be an SD card interface or an MMC interface, but the inventive concept is not limited thereto.

The card interface 620 may interface data between the host 630 and the memory controller 100 according to a protocol of the host 630. The card interface 620 may support a USB protocol and an interchip (IC)-USB protocol. Here, the card interface 620 may indicate a hardware supporting a protocol used by the host 630, software installed in the hardware, or a signal transmission mode.

When the electronic device 600 is connected with the host 630, such as a PC, a laptop computer, a tablet PC, a digital camera, a digital audio player, a cellular/mobile phone, a video game console, an MP3 player, a PMP, an e-book, or a digital set-top box, a host interface 650 of the host 630 may perform data communication with the non-volatile memory device 200 through the card interface 620 and the memory controller 100 according to the control of a microprocessor 640.

Figure 17:
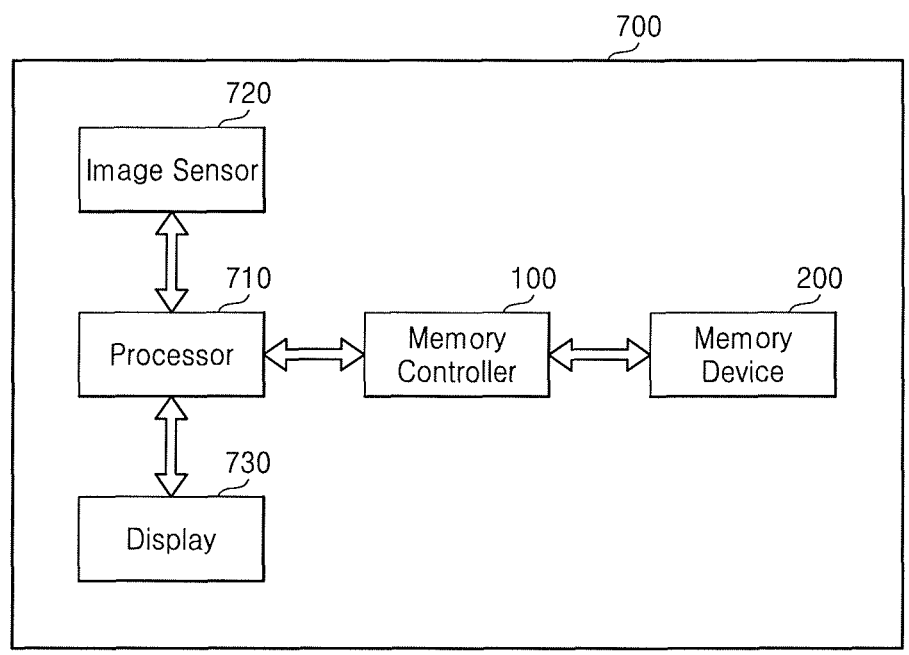
FIG. 17 is a diagram of an electronic device including the memory system illustrated in FIG. 1 according to an exemplary embodiment of the inventive concept.

FIG. 17 is a diagram of an electronic device 700 including the memory system 10 illustrated in FIG. 1 according to an exemplary embodiment of the inventive concept. Referring to FIGS. 1 and 17, the electronic device 700 may be implemented as an image processor like a digital camera, a cellular/mobile phone equipped with a digital camera, a smart phone equipped with a digital camera, or a tablet PC equipped with a digital camera. The electronic device 700 includes the non-volatile memory device 200 and the memory controller 100 controlling the data processing operations, such as the program operation, the erase operation, and the read operation, of the non-volatile memory device 200.

An image sensor 720 included in the electronic device 700 converts optical images into digital image signals and outputs the digital image signals to a processor 710 and/or the memory controller 100. According to the control of the processor 710, the digital image signals may be displayed on a display 730 or may be stored in the non-volatile memory device 200 through the memory controller 100. In addition, data stored in the non-volatile memory device 200 may be displayed on the display 730 according to the control of the processor 710 and/or the memory controller 100.

The memory controller 100, which may control the operations of the non-volatile memory device 200, may be implemented as a part of the processor 710 or as a separate chip.

Figure 18:
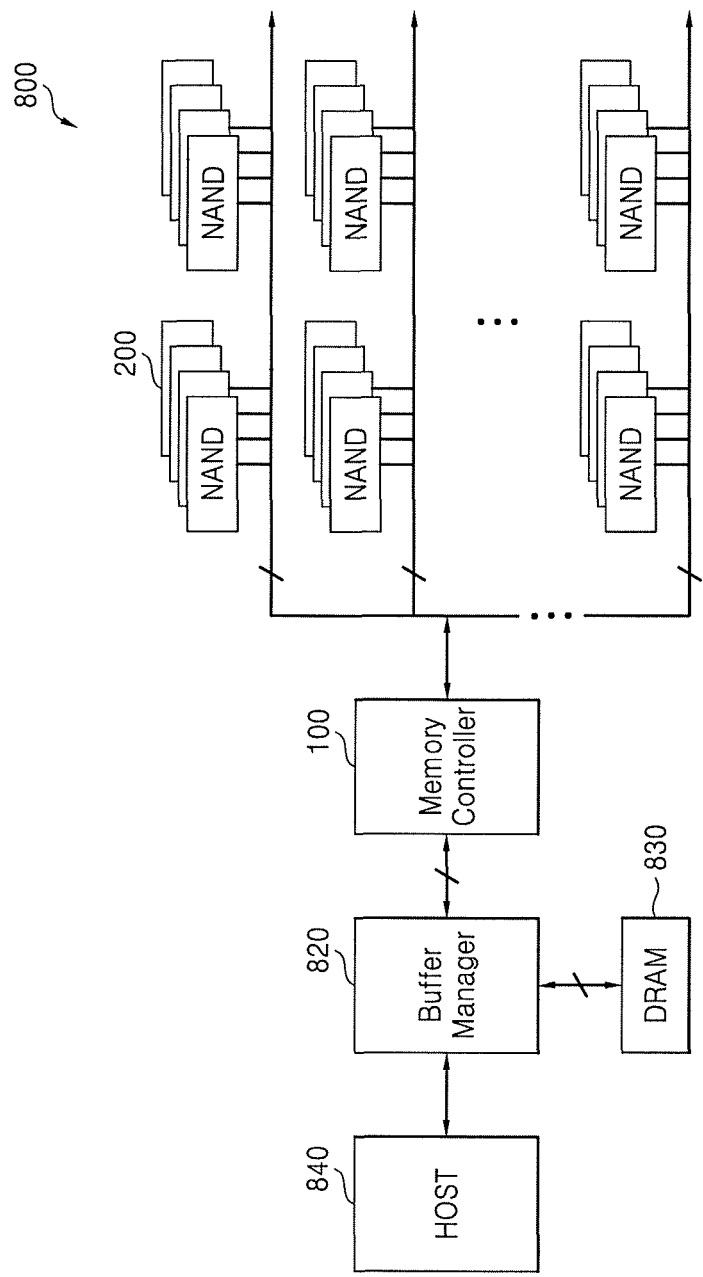
FIG. 18 is a diagram of an electronic device including the memory system illustrated in FIG. 1 according to an exemplary embodiment of the inventive concept.

FIG. 18 is a diagram of an electronic device 800 including the memory system 10 illustrated in FIG. 1 according to an exemplary embodiment of the inventive concept. Referring to FIGS. 1 and 18, the electronic device 800 may be implemented as a data processing device such as a solid state drive (SSD). The electronic device 800 includes a plurality of SSD memory devices 200, the memory controller 100, a volatile memory device 830, and a buffer manager 820.

The memory controller 100 may control the data processing operations of the SSD memory devices 200. Each of the SSD memory devices 200 may be implemented as the non-volatile memory device 200 illustrated in FIG. 1, for example, a NAND flash memory device. Each SSD memory device 200 includes a plurality of pages. The memory controller 100 may program data to a page included in one of the SSD memory devices 200.

The volatile memory device 830 may be implemented as dynamic random access memory (DRAM). The volatile memory device 830 temporarily stores data transferred between the memory controller 100 and a host 840. The buffer manager 820 may control the data buffering operation of the volatile memory device 830 and/or the memory controller 100.

Figure 19:
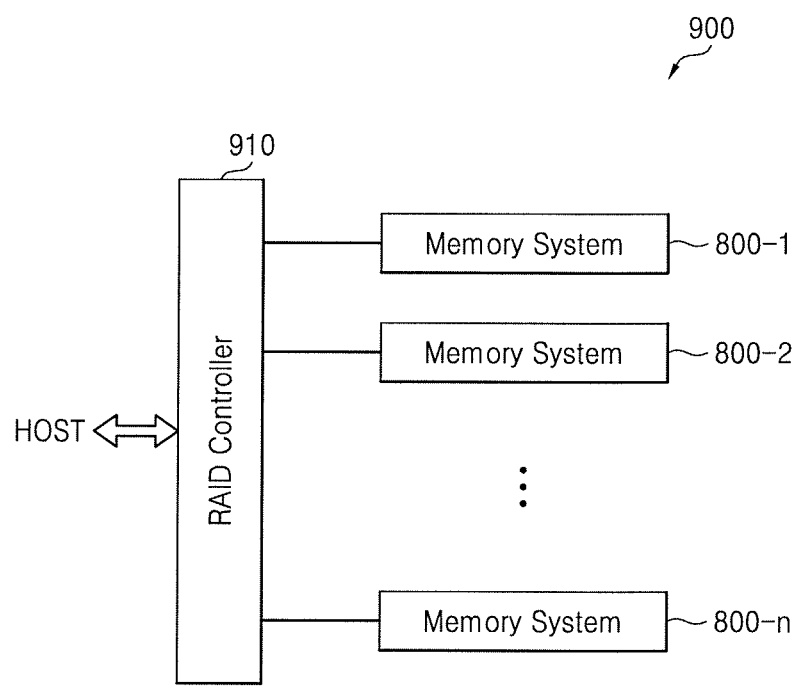
FIG. 19 is a diagram of a data processing system including the memory system illustrated in FIG. 1 according to an exemplary embodiment of the inventive concept.

FIG. 19 is a diagram of a data processing system 900 including the memory system 10 illustrated in FIG. 1 according to an exemplary embodiment of the inventive concept. Referring to FIGS. 1, 18, and 19, the data processing system 900 may be implemented as a redundant array of independent disks (RAID) system. The data processing system 900 may include a RAID controller 910 and a plurality of electronic devices 800-1 through 800-n, where "n" is a natural number (e.g., n>=1).

Each of the electronic devices 800-1 through 900-n may be the electronic device 800 illustrated in FIG. 18. The electronic devices 800-1 through 800-n may form a RAID array. The data processing system 900 may be a PC, a network-attached storage (NAS), or an SSD. Each of the electronic devices 800-1 through 800-n may be a memory system implemented in a form of a memory module.

During a program operation, the RAID controller 910 may transmit data output from a host to at least one of the electronic devices 800-1 through 800-n based on a RAID level at the program request of the host. During a read operation, the RAID controller 910 may transmit data read from at least one of the electronic devices 800-1 through 800-n to the host in response to a read command received from the host.

As described above, according to at least one embodiment of the inventive concept, write data is encoded according to stuck bit data generated based on a cell state of each of MLCs, so that the write data can be stored even in MLCs that have not been erased completely. In addition, encoding may be performed on each page, so that write data can be written page by page. Also, encoding and decoding may be performed using a binary code, so that the encoding and the decoding can be simplified.

At least one embodiment of the inventive concept can be embodied as computer-readable codes having computer executable instructions on a computer-readable medium. For example, the operations of FIG. 13 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

Please note the threshold voltage described above may refer to the threshold voltage of a memory cell of a flash memory, where the memory cell may include a transistor structure having a control gate and floating-gate.

While the inventive concept has been particularly shown and described with reference to exemplary embodiments thereof, it will be understood that various changes in forms and details may be made therein without departing from the spirit and scope of the inventive concept.

What is claimed is:

1. A method of processing data using a memory controller, the method comprising:

for each multi-level cell (MLC) of a plurality of multi-level cells, where each multi-level cell includes a plurality of data pages:
  determining a current programming state of the MLC from among a plurality of programming states;
  determining remaining programming states from among the programming states to which the MLC can be changed to from the current programming state;
  determining a stuck bit is present in a data page of the MLC when the remaining programming states indicate a value of the data page is mappable to only a single mapping value to generate stuck bit data regarding the stuck bit; and
encoding write data to be stored in the multi-level cells based on the stuck bit data.

2. The method of claim 1, wherein the stuck bit data comprises information about a position of the stuck bit and information about a stuck value of the stuck bit.

3. The method of claim 1, wherein each programming state corresponds to a different gray code.

4. The method of claim 1, wherein the encoding the write data is performed in units of the data pages.

5. The method of claim 4, wherein the encoding is performed on each of the plurality of data pages using codes having a different number of bits, respectively.

6. The method of claim 1, wherein the encoding is performed using a binary code.

7. The method of claim 1, wherein the encoding comprises rearranging the write data based on the stuck bit data.

8. A memory controller comprising:
 a determination module configured to determine at least one cell state to which each of a plurality of multi-level cells can be changed to based on a current cell state of each of the multi-level cells, where each multi-level cell includes a plurality of data pages;
 a generation module configured to determine one of the data pages as having a stuck bit when a value of the data page has a single mapping value based on mapping values mapped to the at least one cell state and to generate stuck bit data regarding the stuck bit; and
 an encoder configured to encode write data to be stored in the multi-level cells based on the stuck bit data,
 wherein the generation module comprises:
 a first determination module configured to determine a mapping value corresponding to each of the data pages based on the mapping values mapped to the at least one cell state in a bit-labeling map; and
 a second determination module configured to determine the data page having the single mapping value as the stuck bit according to an output of the first determination module and to generate the stuck bit data regarding the stuck bit.

9. The memory controller of claim 8, wherein the stuck bit data comprises information about a position of the stuck bit and information about a stuck value of the stuck bit.

10. The memory controller of claim 8, wherein the encoder performs encoding in units of the data pages.

11. A memory system comprising:
 the memory controller of claim 8; and
 a memory device comprising the plurality of multi-level cells.

12. The memory system of claim 11, wherein the memory device is a NAND flash memory device.

13. An electronic device comprising:
 the memory system of claim 11; and
 a buffer manager configured to control a data buffering operation of the memory controller.

14. The electronic device of claim 13, wherein the memory device is a NAND flash memory device.

15. A memory controller configured to interface with a memory device, the memory controller comprising:
 a bit-labeling map storing an entry comprising bits for each page of a multi-bit cell, where each of the bits is mapped to one of a plurality of programming states; and
 a determination module determines a given page of the multi-bit cell within the memory device has a fault when a threshold voltage distribution associated with the multi-bit data cell is representative of one of the programming states, and all bit values among the programming states associated with a higher threshold voltage distribution within the entry of the bit-labeling map associated with the given page are the same.

16. The memory controller of claim 15, wherein the determination module generates error information that indicates the data page is fixed to a first bit value.

17. The memory controller of claim 16, wherein the determination module further comprises an encoder configured to encode data for storage in a part of the memory device including the data page by rearranging the encoded data to ensure that a data bit of the encoded data set to a second other bit value is not stored in the data page.

18. The memory controller of claim 16, wherein the error information further indicates a location of the data page within the memory device.

19. The memory controller of claim 15, further comprising: a memory interface configured to interface with the memory device; and a data bus configured to interface the memory interface with the determination module.

* * * * *